(12) United States Patent
Takano

(10) Patent No.: US 8,083,045 B2
(45) Date of Patent: Dec. 27, 2011

(54) ENGINE WITH CENTRIFUGAL CLUTCH

(75) Inventor: Kiyohito Takano, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 428 days.

(21) Appl. No.: 12/318,402

(22) Filed: Dec. 29, 2008

(65) Prior Publication Data

US 2010/0163363 A1 Jul. 1, 2010

(51) Int. Cl.
*F16D 43/18* (2006.01)
*F16D 13/74* (2006.01)

(52) U.S. Cl. ........... 192/105 CD; 192/113.3; 192/113.5; 123/196 R; 184/6.5

(58) Field of Classification Search .................. None
See application file for complete search history.

(56) References Cited

U.S. PATENT DOCUMENTS

| 1,286,985 | A | * | 12/1918 | Freer | 184/6.6 |
| 2008/0078619 | A1 | * | 4/2008 | Mizuno et al. | 184/6.5 |
| 2008/0081714 | A1 | * | 4/2008 | Ogasawara et al. | 474/18 |

FOREIGN PATENT DOCUMENTS

JP 2006-105132 4/2006

* cited by examiner

*Primary Examiner* — David D Le
*Assistant Examiner* — Jacobs S Scott
(74) *Attorney, Agent, or Firm* — Wenderoth, Lind & Ponack, LLP

(57) ABSTRACT

An engine with a centrifugal clutch which can efficiently cool and lubricate the centrifugal clutch. The engine supports a pair of journal portions of a crankshaft by a bearing such as a ball bearing, a roller bearing, or the like, as well as a bearing metal. There is provided first oil supplying means formed in the crankshaft. The first oil supplying means has an oil passage for the first oil supplying means which is communicated with a main oil passage through an oil hole formed in the bearing metal and extends through a fitting portion of a crankpin to reach the centrifugal clutch.

5 Claims, 7 Drawing Sheets

ENGINE WITH CENTRIFUGAL CLUTCH

BACKGROUND OF THE INVENTION

1. Field of the Invention

The present invention relates to an engine with a centrifugal clutch. More specifically, the present invention relates to an engine which has a centrifugal clutch at an end of a crankshaft and an oil supplying configuration which supplies cooling and lubricating oil to the centrifugal clutch.

2. Description of the Related Art

A centrifugal clutch provided on a crankshaft of an engine typically has an inner member fixed to the crankshaft and a clutch housing fixed to a driven rotational member. The inner member has a centrifugal weight moved radially outward by a centrifugal force generated by rotation of the crankshaft. The centrifugal weight has a clutch shoe made of a friction member. The clutch housing has a cylindrical portion which is located radially outside and opposite the centrifugal weight and with which the clutch shoe of the centrifugal weight can be brought into contact. Such a centrifugal clutch generates heat due to friction heat between the clutch shoe and the cylindrical portion of the clutch housing. A cooling configuration is therefore necessary.

Japanese Patent Application Publication No. 2006-105132 discloses a centrifugal clutch of an engine having a cooling configuration. Oil is reserved in a lower portion of a clutch housing which houses the centrifugal clutch. A lower end of the clutch housing of the centrifugal clutch is immersed in the oil to cool the clutch housing.

In the above configuration according to the prior art, however, when the clutch housing is excessively immersed in the oil in order to improve a cooling effect, rotational resistance due to the oil is increased and a power loss of the crankshaft can be increased.

Aside the above cooling configuration, there is a cooling configuration which uses an oil passage formed in a crankshaft to supply oil to a centrifugal clutch. When the oil passage for cooling the centrifugal clutch is formed in the crankshaft, a journal portion of the crankshaft having the centrifugal clutch is supported by a bearing such as a ball bearing or a roller bearing. The oil thus cannot be supplied from the oil passage of a crankcase to the oil passage in the crankshaft via the bearing. In the prior art, an oil chamber is formed or a bearing metal having an oil hole is arranged adjacent to the bearing, so that the oil is supplied from the oil passage in the crankcase to the oil passage formed in the crankshaft and then to the centrifugal clutch.

In the configuration which has the oil chamber or the like formed adjacent to the bearing such as the ball bearing or the roller bearing, a length of the crankshaft becomes longer and a width of an engine in a direction of the crankshaft becomes larger. Particularly in an engine which couples a drive pulley of a V-belt type continuously variable transmission to a centrifugal clutch provided at the end of a crankshaft, the length of the engine in the direction of the crankshaft becomes longer.

SUMMARY OF THE INVENTION

The present invention has been made in view of the above problems and provides an engine with a centrifugal clutch including: a) a crankshaft which has at least a pair of journal portions spaced apart from each other in a direction of the crankshaft; b) a crankcase which rotatably supports one of the pair of journal portions of the crankshaft via a bearing metal and rotatably supports the other of the pair of journal portions via a bearing; c) the centrifugal clutch which is mounted at an end of the crankshaft where the bearing is arranged; d) a main oil passage connected to an oil pump which is rotated by the crankshaft; and e) first oil supplying means formed in the crankshaft to supply oil to the centrifugal clutch, the first oil supplying means having an oil passage for the first oil supplying means which is communicated with the main oil passage through an oil hole formed in the bearing metal and extends through a fitting portion of a crankpin to the centrifugal clutch.

With the above configuration, the oil passage which is communicated with the main oil passage in the crankcase and extends from the oil hole of the bearing metal to the fitting portion of the crankpin and the centrifugal clutch mounted at the end of the crankshaft can be formed in the crankshaft without increasing the length of the crankshaft.

In the above configuration, the engine with a centrifugal clutch according to the present invention preferably further includes f) second oil supplying means which supplies oil to the centrifugal clutch, the second oil supplying means having an oil passage for the second oil supplying means which is communicated with the main oil passage and extends in a wall of the crankcase toward where the centrifugal clutch is arranged, and an oil nozzle which is communicated with the oil passage for the second oil supplying means and ejects the oil toward an inner member of the centrifugal clutch and a cylindrical portion of a clutch housing surrounding the inner member.

With the above configuration, the oil can be precisely supplied by the second oil supplying means to the cylindrical portion of the clutch housing and a clutch shoe of the inner member which generate a large amount of friction heat while the clutch is operated. A cooling effect of the centrifugal clutch can be improved.

In the above configuration, the engine with a centrifugal clutch according to the present invention preferably further includes g) third oil supplying means which supplies oil to the centrifugal clutch, the third oil supplying means having an oil reservoir which reserves the oil at a lower end of a clutch housing which houses the centrifugal clutch to a height at which a lower end of the centrifugal clutch is immersed.

With the above configuration, the cylindrical portion of the clutch housing of the centrifugal clutch can be cooled only by reserving the oil without applying a pressure to the oil.

The engine with a centrifugal clutch according to the present invention can include both the second oil supplying means and the third oil supplying means. A cooling function of the centrifugal clutch can be further improved.

In the above configuration provided with the oil reservoir, in the present invention, preferably, the oil reservoir has a weir which stops the oil at a predetermined height and the weir is formed at a lower end with a hole which gradually discharges the stopped oil.

With the above configuration, the oil in the oil reservoir is gradually replaced with newly supplied oil. Therefore, temperature rise of the oil in the oil reservoir can be prevented. Further, deterioration of the oil in the oil reservoir can be prevented.

In the above configuration, in the present invention, preferably, the clutch housing of the centrifugal clutch is coupled to a drive shaft of a V-belt type continuously variable transmission which is arranged on an extension line of the crankshaft.

With the above configuration, out of the plurality of journal portions of the crankshaft, the centrifugal clutch is mounted at an end of the crankshaft supported by the ball bearing or the roller bearing and is coupled to the drive shaft of the V-belt type continuously variable transmission. Accordingly, as compared with a configuration of supporting by the bearing metal, friction resistance or the like is smaller and power transmission loss can be reduced.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE INVENTION

FIGS. 1 to 6 illustrate a first embodiment of an engine according to the present invention. An embodiment of the present invention will be described with reference to these drawings.

Figure 1:
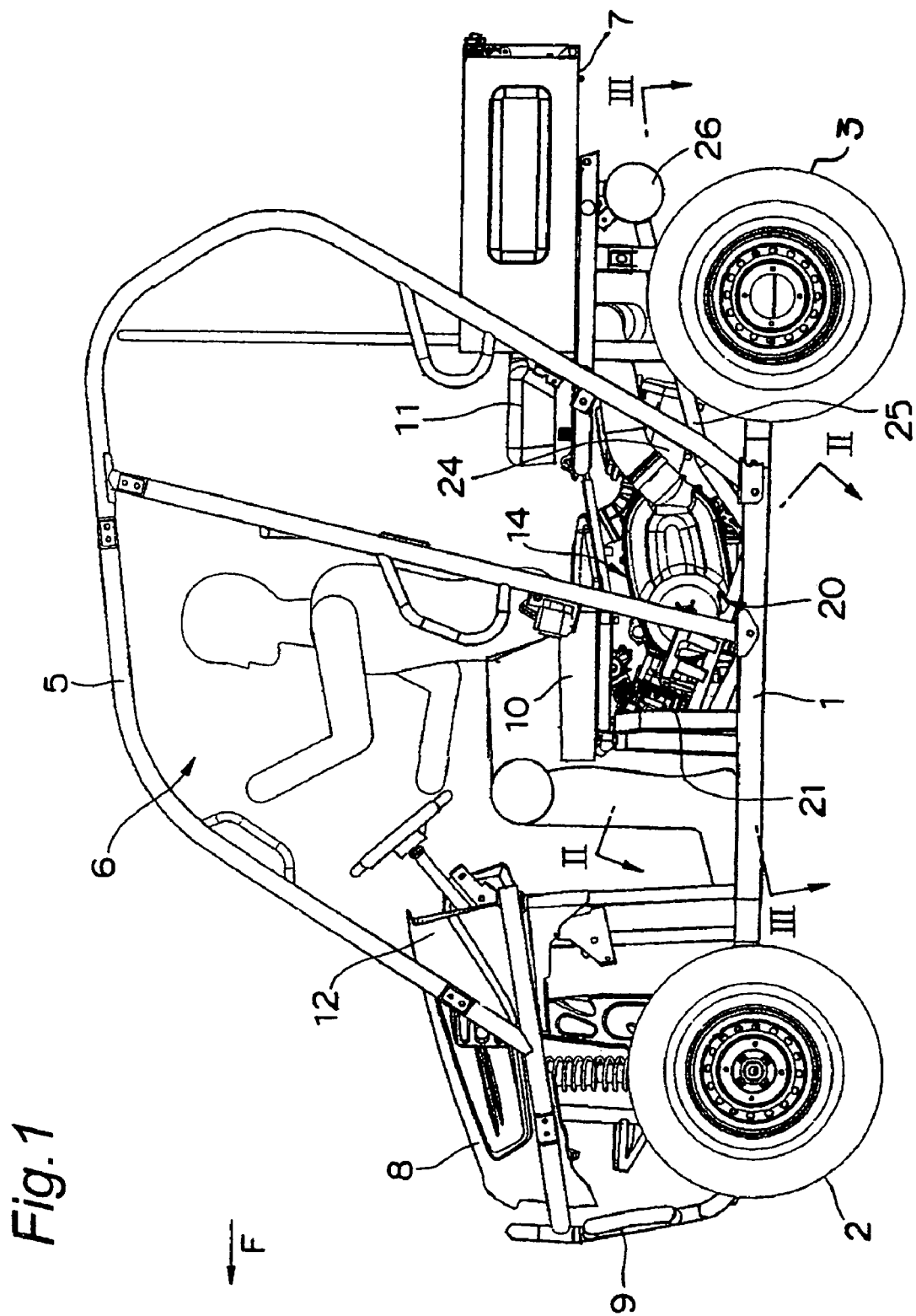
FIG. 1 a left side view, partially broken away, of a four-wheeled vehicle on which an engine with a centrifugal clutch according to an embodiment of the present invention is mounted.

FIG. 1 is a left side view, partially broken away, of a small four-wheeled vehicle for irregular grounds (a so-called utility vehicle) on which an engine with a centrifugal clutch according to the present invention is mounted. In FIG. 1, the four-wheeled vehicle has a pair of right and left front wheels 2 in a front portion of a body frame 1, a pair of right and left rear wheels 3 in a rear portion of the body frame 1, a cabin 6 surrounded by a cabin frame 5 between the front wheels 2 and the rear wheels 3, a loading space 7 rearwardly of the cabin 6, a bonnet 8 and a bumper 9 forwardly of the cabin 6, and fenders over wheels 2 and 3.

A bench type front seat 10 is installed in a front half portion in the cabin 6. A folding, bench type rear seat 11 is installed in a rear half portion in the cabin 6. A dashboard (an operating portion) 12 is provided at a front end of the cabin 6. The front and rear seats 10 and 11 are not limited to the bench type. Alternatively, a separate type box seat may be installed.

An engine room 14 is formed from a space below the front seat 10 to a space below the rear seat 11 and is located in a substantially center portion of the vehicle in a vehicle width direction. An engine 20 is housed in the engine room 14 and is supported on the body frame 1. The engine 20 is of a single-cylinder type and has a single cylinder 21 tilted forward. In order to reduce an overall height of the engine 20, a tilt angle of the cylinder 21 is set to approximately 60° or more relative to a vertical direction. The engine 20 can have a cylinder of a V-type or of another type.

An air intake device such as an air cleaner 24 for an engine is arranged in a space rearwardly of the engine 20. An exhaust pipe 25 connected to an exhaust port (not illustrated) of the engine 20 extends rearward and is connected to an exhaust muffler 26 arranged below the loading space 7. The air cleaner 24 may be arranged in the bonnet 8 forwardly of a steering wheel.

Figure 2:
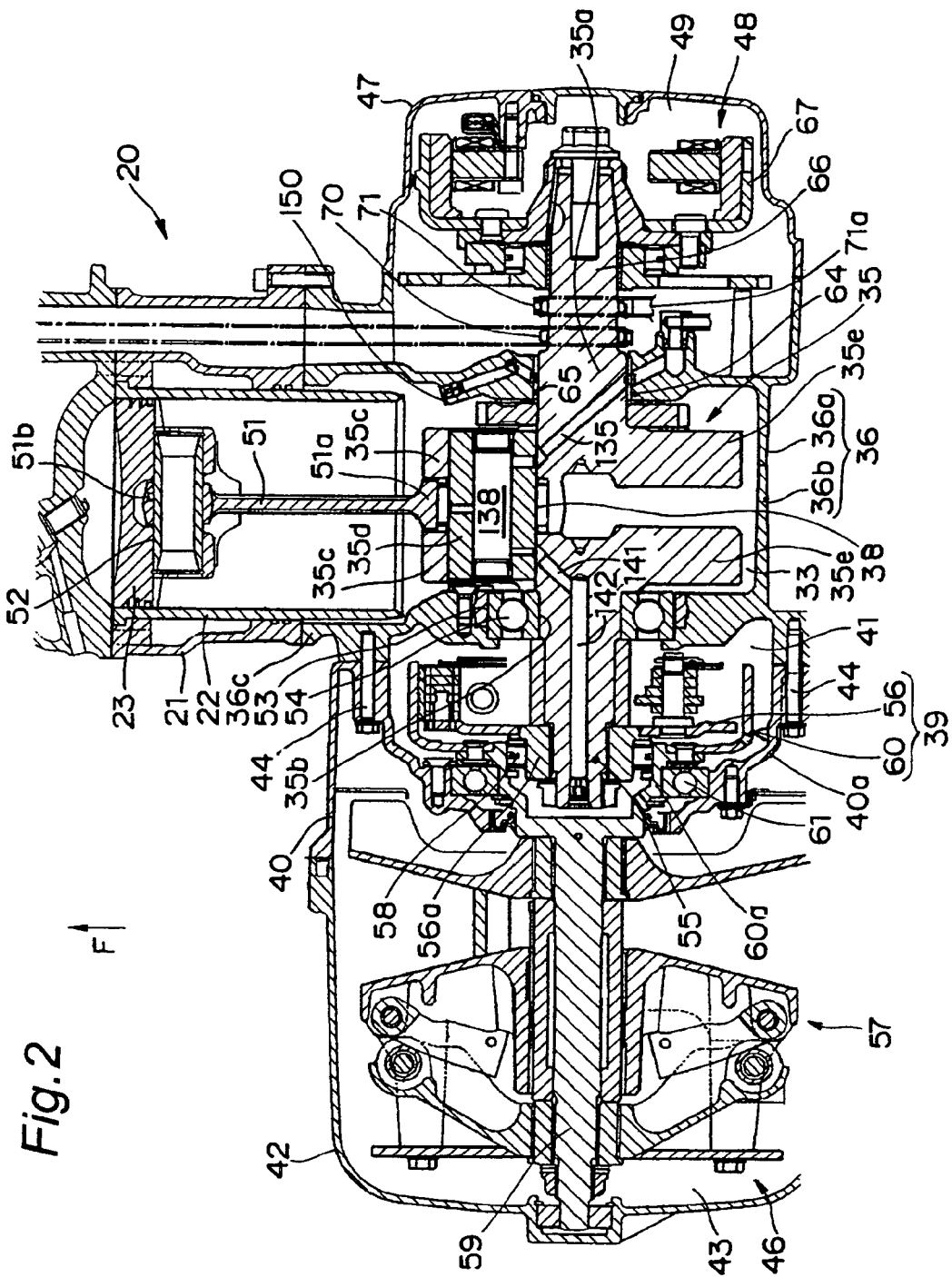
FIG. 2 is an enlarged sectional view of the engine of FIG. 1 taken along line II-II.

FIG. 2 is an enlarged sectional view of the engine 20 of FIG. 1 taken along line II-II. In FIG. 2, a cylindrical cylinder liner 22 is provided in the cylinder 21. A piston 23 is slidably fitted onto an inner circumferential surface of the cylinder liner 22.

A crankshaft 35 is housed in a crank housing 33 of a crankcase 36. The crankcase 36 is divided into a right crankcase member 36a and a left crankcase member 36b. The crankcase members 36a and 36b are coupled to each other in a substantially center portion of a width of the engine 20 in a direction of the crankshaft. The cylinder 21 is coupled to a bore portion 36c formed at a front upper end of the crankcase 36.

Figure 3:
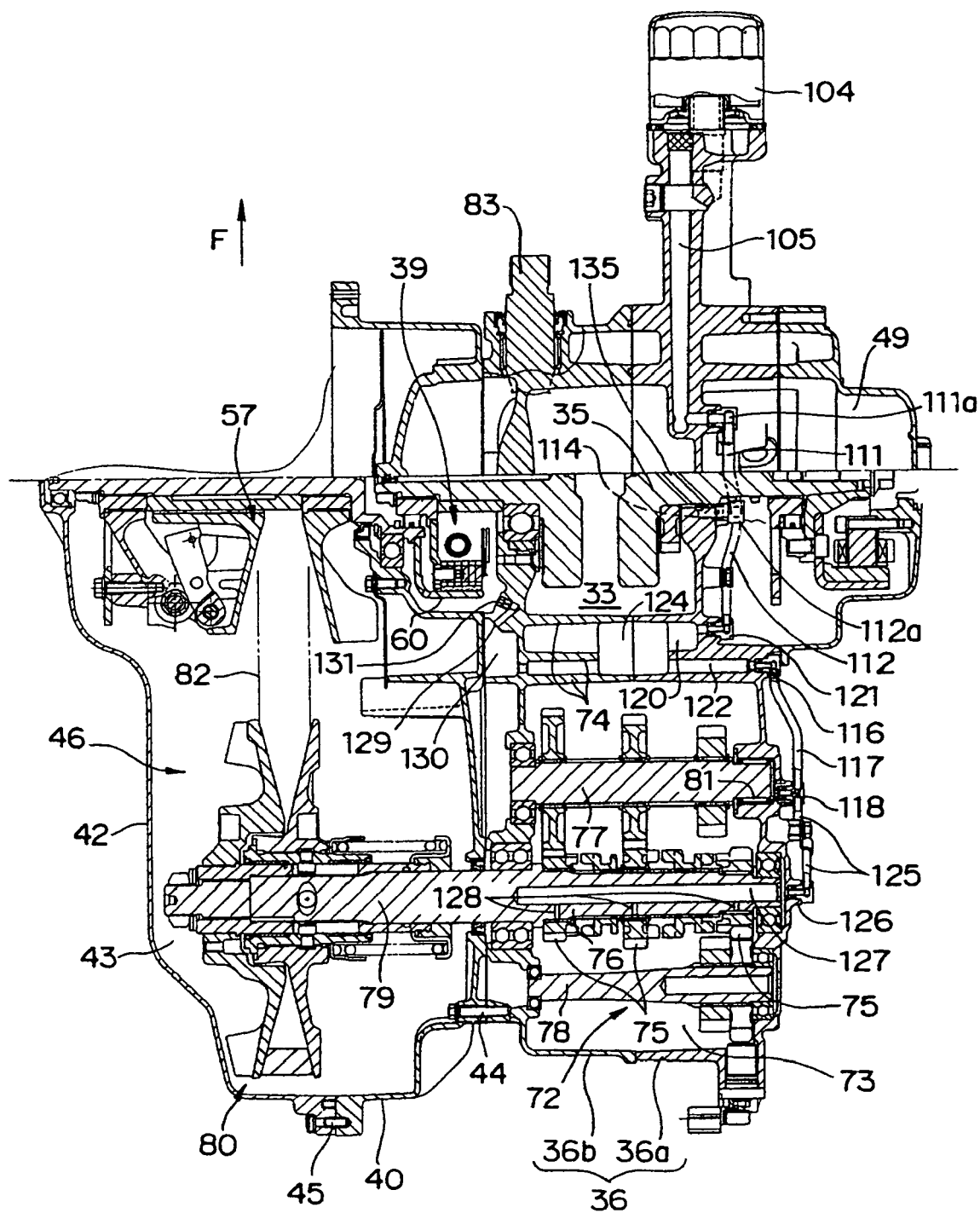
FIG. 3 is an enlarged sectional view of the engine of FIG. 1 taken along line III-III, in which an inner structure of an upper portion in the drawing is now shown.

A belt converter case 40 integrally having a clutch cover 40a is coupled to s left end face of the left crankcase member 36b using a plurality of bolts 44 (FIG. 3). A clutch housing 41 which houses the centrifugal clutch 39 is formed by the clutch cover 40a and the left crankcase member 36b. A belt converter cover 42 is fastened to a left end face of the belt converter case 40 using a plurality of bolts 45. A belt converter housing 43 which houses a belt converter (V-belt type continuously variable transmission) 46 is formed by the belt converter case 40 and the belt converter cover 42.

A generator cover 47 is fastened to a right end face of the right crankcase member 36a using a plurality of bolts (not illustrated). A generator housing 49 which houses a generator 48 is formed by the right crankcase member 36a and the generator cover 47.

The crankshaft 35 has right and left journal portions 35a and 35b spaced apart from each other in the direction of the crankshaft, a pair of crank arms 35c and 35c formed between the journal portions 35a and 35b, a crankpin 35d which couples the crank arms 35c and 35c, and weight portions 35e and 35e which are projected in a direction radially opposite the crank arms 35c and 35c. The crankpin 35d is fitted onto an inner circumferential surface of a large end 51a of a connecting rod 51 via a plurality of rollers (or bearing metals) 38. The connecting rod 51 extends into the cylinder liner 22. A small end 51b of the connecting rod 51 is coupled to the piston 23 via a piston pin 52.

The left journal portion 35b of the crankshaft 35 is rotatably fitted in a bearing hole 53 formed in the left crankcase member 36b via a ball bearing 54. The left journal portion 35b is formed integrally with a clutch shaft 55 protruded into the clutch housing 41. A boss portion 56a of an inner member 56 of the centrifugal clutch 39 is spline fitted onto an outer circumferential surface of the clutch shaft 55 so as to rotate integrally with the clutch shaft 55. A boss portion 60a of a clutch housing 60 is fitted onto an outer circumferential surface of the boss portion 56a via a one-way clutch 58. The boss portion 60a is formed integrally with a drive shaft 59 of the belt converter 46 and is rotatably fitted onto an inner circumferential surface of the clutch cover 40a via a ball bearing 61.

The drive shaft 59 of the belt converter 46 is protruded into the belt converter housing 43. A drive pulley 57 of the belt converter 46 is mounted on an outer circumferential surface of the drive shaft 59.

The right journal portion 35a of the crankshaft 35 is rotatably fitted onto an inner circumferential surface of a bearing hole 64 formed in the right crankcase member 36a via a bearing metal 65. The right journal portion 35a is formed integrally with a generator shaft 66 protruded into the generator housing 49. A rotor 67 of the generator 48 is fixed to the generator shaft 66. The generator shaft 66 is provided with a chain sprocket (chain gear) 70 for driving a cam, and a chain sprocket (chain gear) 71 for driving an oil pump.

FIG. 3 is an enlarged sectional view taken along line III-III of FIG. 1, in which an inner structure above the crankshaft core is not shown in the drawing. In FIG. 3, a transmission case 73 which houses a gear transmission 72 is formed in a rear portion of the crankcase 36. The transmission case 73 and the front crank housing 33 are partitioned by a partition wall 74. The gear transmission 72 has a transmission input shaft 76, a countershaft 77, a reversing idle shaft 78, and an output shaft (not illustrated), which are in parallel with the crankshaft 35. Like a known gear transmission, shift gears provided respectively on the shafts 76, 77, and 78 are engaged with one another. An engaging train of the gears is selected for gear shifting. The output shaft has a gear which is engaged with an output gear of the countershaft 77. Power is transmitted from the output shaft to the front wheels 2 and the rear wheels 3 (FIG. 1) via a bevel gear mechanism (not illustrated), a two-wheel-drive or four-wheel-drive switching device (not illustrated), a forwarding drive shaft 83, and a reversing drive shaft (not illustrated).

A driven shaft 79 for the belt converter which is protruded into the belt converter housing 43 is formed integrally with a left end of the input shaft 76 of the gear transmission 72. A driven pulley 80 of the belt converter 46 is attached to the driven shaft 79. A V-belt 82 is wound around the driven pulley 80 and the drive pulley 57.

(Centrifugal Clutch)

Figure 4:
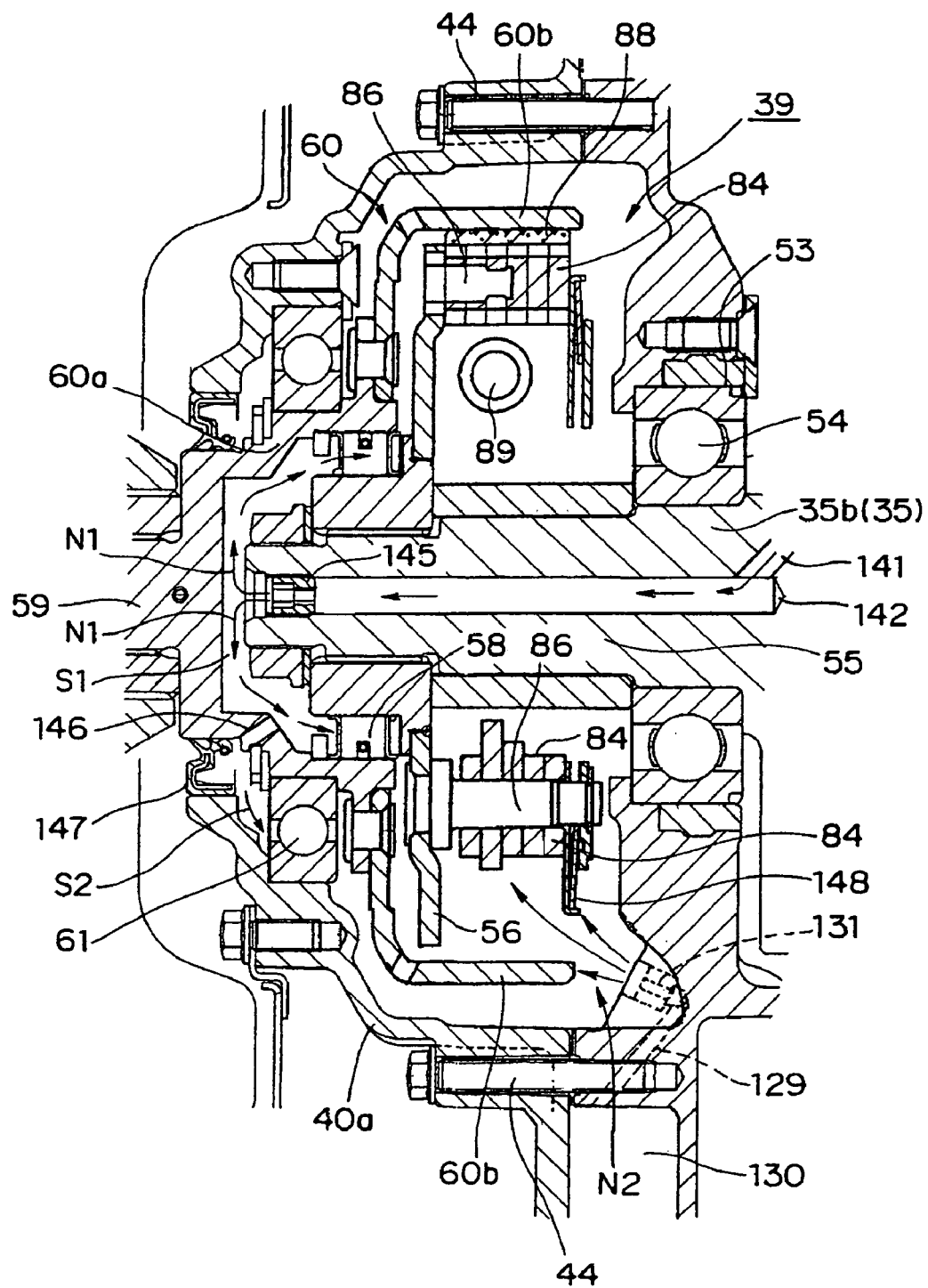
FIG. 4 is an enlarged sectional view of the centrifugal clutch of the engine of FIG. 1.

FIG. 4 is an enlarged sectional view of the centrifugal clutch. In FIG. 4, a plurality of centrifugal weights 84 are arranged in the inner member 56 of the centrifugal clutch 39 so as to be equally spaced around the clutch shaft. The centrifugal weights 84 are rotatably supported on a weight support shaft 86 which is fixed to an outer circumferential end of the inner member 56. A clutch shoe 88 formed of a friction member is attached radially outside the centrifugal weights 84.

The centrifugal weights 84 are biased radially inward (toward the clutch shaft 55) by a coil spring 89. The centrifugal weights 84 are moved radially outward against the clutch spring 89 due to a centrifugal force generated by rotation of the clutch shaft 55. The clutch shoe 88 is pressed to be in contact with an inner circumferential surface of a cylindrical portion 60b of the clutch housing 60, so that the centrifugal clutch 39 is connected, and power is thus transmitted.

(Main Oil Supplying Means)

Figure 6:
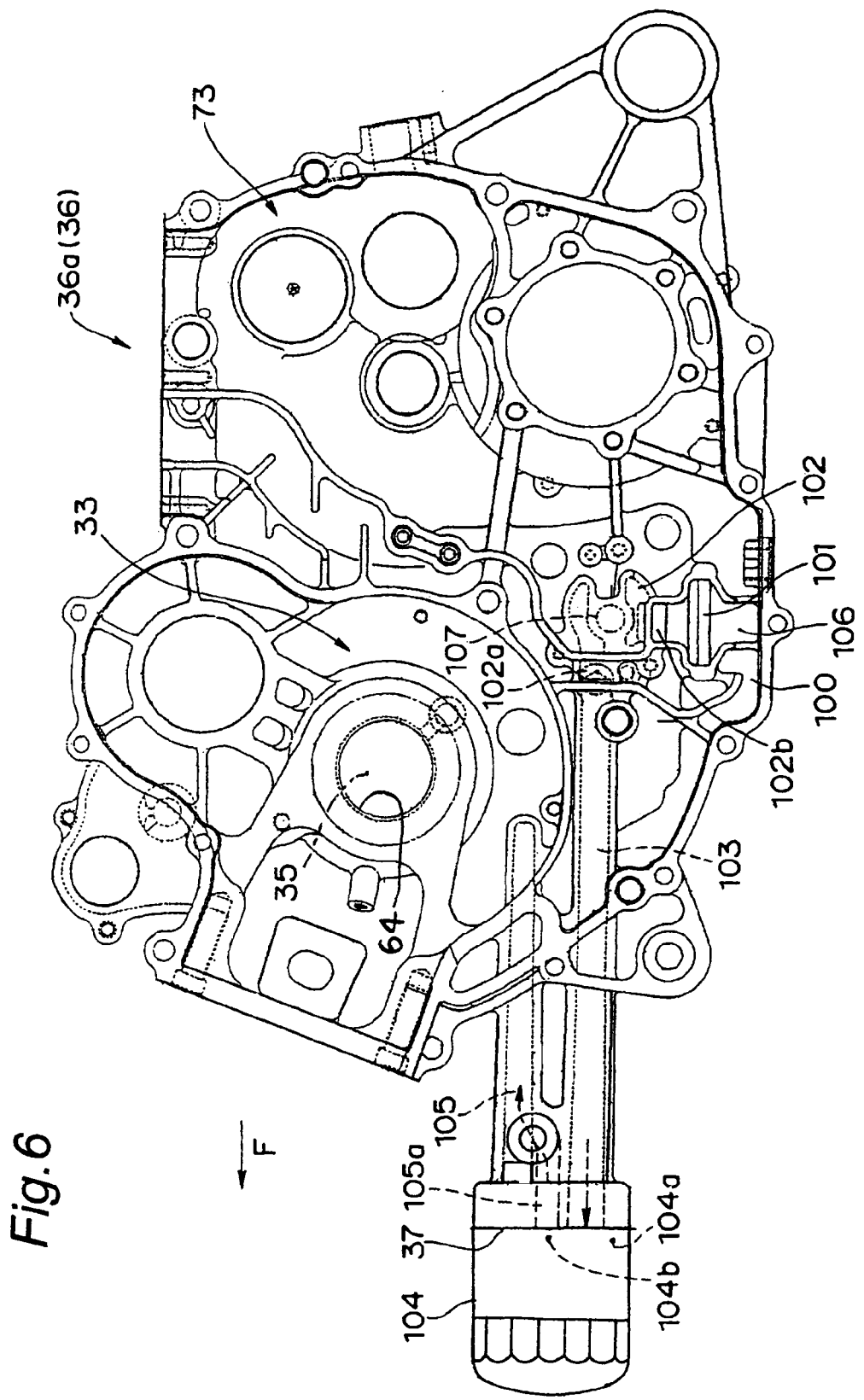
FIG. 6 is a left side view (an inner side view) of a right crankcase member of the engine of FIG. 1.

FIG. 6 is a left side view of the right crankcase member 36a. In FIG. 6, main oil supplying means is used for supplying oil from an oil pump 102 to first and second oil supplying means (to be described later). The main oil supplying means has an oil pan 100 formed at the lower end of the crankcase 36, a primary oil filter 101, the oil pump 102, a first main oil passage 103, a secondary oil filter 104, a second main oil passage 105, and the like.

The oil pump 102 is arranged at a front right end of the transmission case 73. A pump shaft 107 in parallel with the crankshaft 35 is coupled, so as to transmit power, to the chain sprocket (chain gear) 71 for driving the pump of the crankshaft 35 (the generator shaft 66) via the sprocket (not illustrated) and a chain 71a for driving the pump (FIG. 2). A suction portion 102b of the oil pump 102 is communicated with a suction passage 106 extending downward. A lower end of the suction passage 106 is opened to the oil pan 100. The plate-shaped primary oil filter 101 is arranged midway the suction passage 106.

A discharge portion 102a of the oil pump 102 is communicated with a rear end of the first main oil passage 103. The first main oil passage 103 is formed in the wall of the right crankcase member 36a and extends forward. The first main oil passage 103 is communicated with an oil inlet 104a of the secondary oil filter 104 which is mounted on a front end face 37 of the right crankcase member 36a. An oil outlet 104b of the secondary oil filter 104 is communicated with a front end 105a of the second main oil passage 105. The second main oil passage 105 is formed in the wall of the right crankcase member 36a. Further, the second main oil passage 105 is located above the first main oil passage 103 and extends rearward to reach forwardly of and below the crankshaft 35.

In FIG. 3, a rear end of the second main oil passage 105 is connected to a front end of a first oil pipe (main oil pipe) 111 arranged in the generator housing 49 via a first oil coupling 111a. The first oil pipe 111 extends rearward in the generator housing 49 to reach substantially below the crankshaft 35. The first oil pipe 111 is communicated with an oil passage 114 formed in the wall of the right crankcase member 36a via a second oil coupling 112a. The oil passage 114 is communicated with a right oil passage (an upstream oil passage) 135 of first oil supplying means (to be described later) formed in the crankshaft 35.

The second oil coupling 112a is further connected to a second oil pipe 112 extending rearward. A rear end of the second oil pipe 112 is connected to an oil passage 120 for the second oil supplying means formed in the partition wall 74 between the crank housing 33 and the transmission case 73 via an oil coupling 121.

In the partition wall 74, a rear oil passage 122 for the second oil supplying means is formed rearwardly of and above the oil passage 120. The rear oil passage 122 is communicated with the front oil passage 120 via a communication housing 124 in the partition wall 74 and extends in right and left directions in substantially parallel with the crankshaft 35.

A left end of the rear oil passage 122 is communicated with a second oil nozzle 131 of the second oil supplying means for cooling the centrifugal clutch via an oil chamber 130 formed in the left crankcase member 36b. A right end of the rear oil passage 122 is communicated with the oil supplying means for supplying oil to the gear transmission 72.

(Oil Supplying Means for Gear Transmission)

In FIG. 3, a right end of the rear oil passage 122 in the partition wall 74 is connected to a third external oil pipe 117 via a fourth oil coupling 116. The third oil pipe 117 extends rearward and is communicated with a fifth oil coupling 118 attached to a right side wall of the transmission case 73 (a right side wall of the right crankcase member 36a). The fifth oil coupling 118 is communicated with a needle bearing 81 of the countershaft 77 of the gear transmission 72. The fifth oil coupling 118 is connected to a fourth oil pipe 125 extending rearward, and the like. A rear end of the fourth oil pipe 125 is communicated with a sixth oil coupling 126 attached to the right side wall of the transmission case 73 (the right side wall of the right crankcase member 36a). The sixth oil coupling 126 is communicated with an oil passage 127 formed in the input shaft 76 of the gear transmission 72. The oil passage 127 extends leftward in the input shaft 76. A plurality of radially extending branch passages 128 are communicated with the oil passage 127. The branch passages 128 are also communicated with a fitting portion of a transmission gear 75 on the input shaft 76.

(First Oil Supplying Means)

Figure 5:
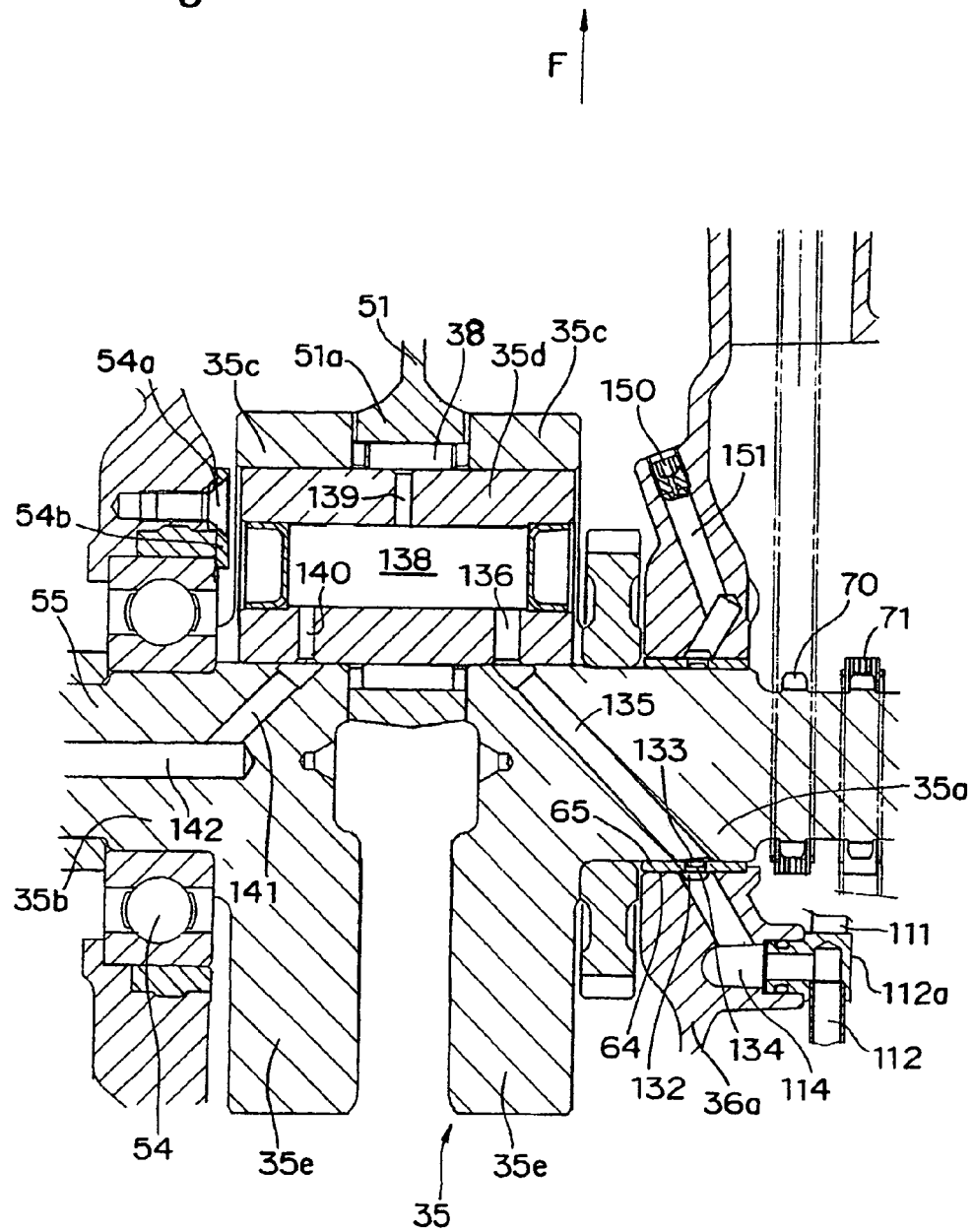
FIG. 5 is an enlarged sectional view of a crankshaft of the engine of FIG. 1.

The first oil supplying means formed in the crankshaft 35 will be described. FIG. 5 is an enlarged sectional view of the crankshaft 35. In FIG. 5, the oil passage 114 in the right crankcase member 36a which is communicated with the second coupling 112a extends upward to be communicated with an annular oil passage 132 formed in an inner circumferential surface of a bearing hole 64 of the right crankcase member 36a. The annular oil passage 132 is communicated with the right oil passage 135 in the crankshaft 35 through a radial oil hole 134 formed in the bearing metal 65 and an annular groove 133 formed in an inner circumferential surface of the bearing metal 65. The annular oil passage 132 of the bearing hole 64 is communicated with an oil nozzle 150 for cooling the piston via another oil passage 151 (not illustrated).

The right oil passage 135 in the crankshaft 35 extends toward the crankpin 35d and is communicated with a fitting portion (a portion where the roller 38 is arranged) between the large end 51a of the connecting rod 51 and the crankpin 35d through a right oil hole 136 formed rightwardly of the crankpin 35d and an intermediate oil hole 139 formed in an oil chamber 138 in the crankpin 35d and in the center portion in an axial direction of the crankpin 35d.

The oil chamber 138 in the crankpin 35 is further communicated with a left oil passage 141 in the crankshaft 35d through a left oil hole 140 formed leftwardly of the crankpin 35d. The left oil passage 141 is communicated with an oil passage 142 for the centrifugal clutch formed in an axial core of the crankshaft 35.

In FIG. 4, the oil passage 142 for the centrifugal clutch extends leftward in the clutch shaft 55 from the inside of the crankshaft 35, so as to reach a left end of the clutch shaft 55, and is opened leftward from a left end face of the clutch shaft 55. A first oil nozzle 145 is fitted in the opening. The first oil nozzle 145 ejects oil to an end face of the boss portion 60a of the clutch housing 60 of the centrifugal clutch 39 (a right end face of the drive shaft 59).

A first space S1 provided between the left end face of the clutch shaft 55 and the end face of the boss portion 60a is used as a passage of oil ejected from the first oil nozzle 145. The first space S1 expands radially outward along the boss portion 60a to reach the one-way clutch 58. The first space S1 further passes through the one-way clutch 58 and extends radially outward along an end face of the inner member 56 to reach the centrifugal weights 84 and the cylindrical portion 60b of the clutch housing 60. The first space S1 is branched through an oil hole 146 formed in the boss portion 60a. The first space S1 is communicated with a second space S2 provided between the inner circumferential surface of the clutch cover 40a and the outer circumferential surface of the boss portion 60a. The second space S2 reaches an oil seal 147 and the ball bearing 61 which are fitted onto the outer circumferential surface of the boss portion 60a.

(Second Oil Supplying Means)

In FIG. 3, the oil chamber 130 formed in the left crankcase member 36b has a left end closed by a part of the belt converter case 40 and is communicated with the second oil nozzle 131 via an oil passage 129.

In FIG. 4, the second oil nozzle 131 of the second oil supplying means is formed to conically eject oil, as indicated by an arrow N2, toward a portion between a right end of the cylindrical portion 60b of the clutch housing 60 and an outer circumferential end of a retaining plate 148 of the centrifugal weights 84. The oil ejected from the second oil nozzle 131 is conically diffused to have a fixed ejection angle, as indicated by the arrow N2. Therefore, the oil can be ejected in a wide range from a right end of the cylindrical portion 60b to the centrifugal weights 48 of the inner member 56.

Figure 7:
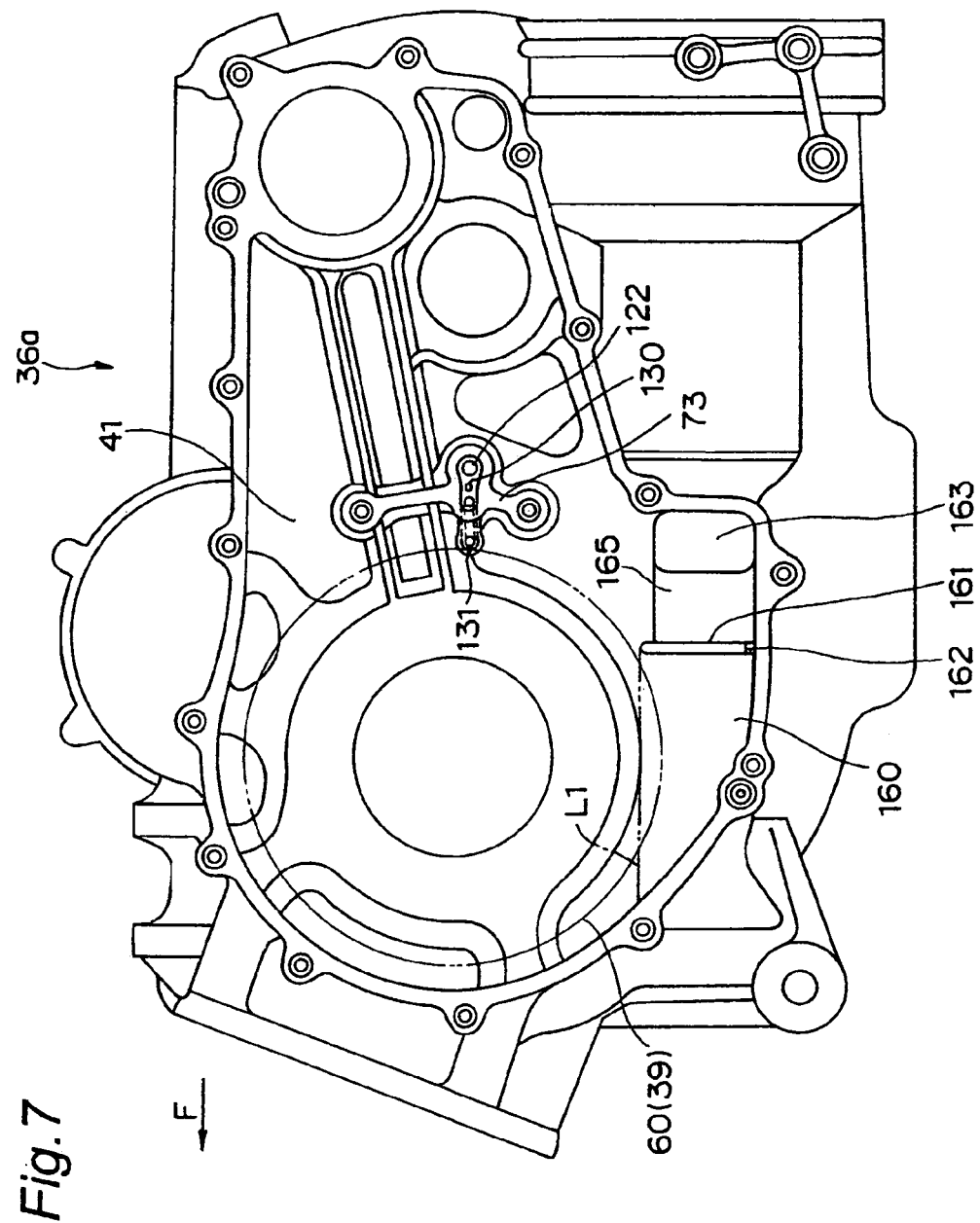
FIG. 7 is a right side view (an outer side view) of the right crankcase member of the engine of FIG. 1.

FIG. 7 is a left side view of the left crankcase member 36b. The second oil nozzle 131 is formed at a position corresponding to a substantially rear end of the clutch housing 60 of the centrifugal clutch 39.

(Third Oil Supplying Means)

In FIG. 7, as the third oil supplying means for the centrifugal clutch 39, an oil reservoir 160 extending downward is formed at a lower end of the clutch housing 41. By forming a weir 161 at a fixed height, the oil reservoir 160 can reserve oil at a level L1 of such a degree that the lower end of the clutch housing 60 is immersed. That is, the lower end of the clutch housing 60 is immersed in the oil reservoir 160, so that the clutch housing 60 can be lubricated and cooled.

A rear space 165 of the weir 161 is communicated with the transmission case 73 through an oil communication hole 163 formed in a side wall of the left crankcase member 36b. A thin hole 162 which is communicated with the oil reservoir 160 and the space 165 is formed at a lower end of the weir 161. The oil in the oil reservoir 160 is gradually discharged from the thin hole 162 to the space 165. Accordingly, residence of the cooling oil in the oil reservoir 160 is eliminated so as to prevent temperature rise of the oil in the oil reservoir 160.

(Operation)

A main oil flow in the engine will be described. In FIG. 6, oil is reserved to a level above an upper end of the oil pan 100 at the lower end of the transmission case 73. The oil in the oil pan 100 is taken in by the oil pump 102 via the primary oil filter 101. The oil is then discharged from the discharge portion 102a into the first main oil passage 103. The oil is pressurized and delivered in the first main oil passage 103 to reach the front end face 37 of the crankcase 36.

The oil supplied from the front end of the first main oil passage 103 through the oil inlet 104a to the secondary oil filter 104 is filtered and is then supplied to the second main oil passage 105 through the oil outlet 104b. The oil is pressurized and delivered in the second main oil passage 105 to a position below the crankshaft 35.

In FIG. 3, part of the oil supplied from the second main oil passage 105 to the first oil pipe 111 is supplied via the second oil coupling 112a to the oil passage 114 in the right crankcase member 36a. The remaining oil is supplied via the second oil pipe 112 and the third oil coupling 121 to the front oil passage 120 of the second oil supplying means in the partition wall 74.

The oil in the front oil passage 120 in the partition wall 74 is supplied through the oil communication passage 124 to the rear oil passage 122 in the partition wall 74.

The oil supplied into the rear oil passage 122 is branched to right and left. The oil flowing to the left is supplied to the second oil nozzle 131 via the oil chamber 130. The oil flowing to the right in the rear oil passage 122 is supplied via the third oil coupling 116, the second oil pipe 117, and the fourth oil coupling 118 to the needle bearing 81 of the countershaft 77 of the gear transmission 72. The oil split-flowed from the fourth oil coupling 118 to the third oil pipe 125 is supplied via the fifth oil coupling 126 and the oil passage 127 in the input shaft 76 to a fitting portion of the gears on the input shaft 76.

In FIG. 5, the oil supplied to the oil passage 114 of the right crankcase member 36a is supplied to the annular oil passage 132 of the bearing hole 64. Part of the oil in the annular oil passage 132 is supplied to the oil nozzle 150 for cooling the piston via the oil passage 151 for cooling the piston. As illustrated in FIG. 2, the part of the oil is ejected toward the piston 23 in the cylinder liner 22.

Referring again to FIG. 5, the remaining oil in the annular oil passage 132 is supplied to the fitting portion (the roller 38) between the large end 51a of the connecting rod 51 and the crankpin 35d through the oil hole 134 of the bearing metal 65, the annular groove 133, the right oil passage 135 in the crankshaft 35, the right oil hole 136 of the crankpin 35d, the oil chamber 138 in the crankpin 35d, and the intermediate oil hole 139 of the crankpin 35d. The oil in the oil chamber 138 passes through the left oil hole 140 of the crankpin 35d and the left oil passage 141 in the crankshaft 35. The oil is then supplied to the oil passage 142 for the centrifugal clutch in the crankshaft 35.

In FIG. 4, the oil in the oil passage 142 for the centrifugal clutch is ejected by the first oil nozzle 145 at the left end toward the end face of the boss portion 60a of the clutch housing 60 (the end face of the drive shaft 59), and is moved radially outward in the first space S1 due to the centrifugal force. Part of the oil in the first space S1 passes through the oil hole 146 of the boss portion 60a and is then supplied into the second space S2, the oil seal 147, the ball bearing 61, and the like. The remaining oil in the first space S1 is supplied to the one-way clutch 58, and then passes through the one-way clutch 58 to be supplied to the cylindrical portion 60b of the clutch housing 60 and the centrifugal weights 84.

Part of the oil ejected from the second oil nozzle 131 directly collides with the cylindrical portion 60b of the clutch housing 60 in order to cool the cylindrical portion 60b. Another part of the oil passes between the cylindrical portion 60b and the retaining plate 148 and is supplied to and cools the centrifugal weights 84 for lubrication.

In FIG. 7, the lower end of the clutch housing 60 of the centrifugal clutch 39 is immersed into the oil reservoir 160 at the lower end of the clutch housing 41. When the clutch housing 60 is rotated, the clutch housing 60 is cooled over an entire circumference by the oil in the oil reservoir 160. Further, the thin hole 162 is formed at the lower end of the weir 161 to gradually discharge the oil in a bottom portion in the oil reservoir 160. Residence of the cooling oil in the oil reservoir 160 is eliminated so as to prevent deterioration and temperature rise of the oil.

According to the present embodiment, the centrifugal clutch 39 is cooled and lubricated by the oil ejected from the first oil nozzle 145 serving as the first oil supplying means, the oil ejected from the second oil nozzle 131 serving as the second oil supplying means, and the oil reserved in the oil reservoir 160 serving as the third oil supplying means. Therefore, the centrifugal clutch 39 which easily generates heat can be effectively cooled and lubricated.

As illustrated in FIG. 5, as a configuration which supplies the oil passage (the right oil passage 135 and the like) in the crankshaft 35 from the main oil passage (the first oil pipe 111, and the like), out of the pair of journal portions 35a and 35b of the crankshaft 35, the right journal portion 35a arranged thereon with the bearing metal 65 is used, without using the left journal portion 35b arranged thereon with the ball bearing 54 to support the clutch shaft 55 and the like. If oil is attempted to be taken into the crankshaft 35 from the left journal portion 35b arranged thereon with the ball bearing 54, then an oil chamber for supplying the oil needs to be provided in the clutch shaft 55 so as to be adjacent to the ball bearing 54. However, like this embodiment, the oil is taken into the crankshaft 35 from the right journal portion 35a arranged thereon with the existing bearing metal 65. As a result, the length of the crankshaft 35 can be shortened. While the oil is pressurized and delivered from the right journal portion 35a to the left centrifugal clutch 39, it is effectively used for lubricating the fitting portion of the crankpin 35d.

Other Embodiments (1) The present invention is not limited to the engine with a centrifugal clutch which is mounted on a four-wheeled vehicle for irregular grounds illustrated in FIG. 1, but is applicable to various vehicles such as a motorcycle, a three-wheeled vehicle, a vehicle engine mounted on a personal watercraft, and also to anything other than a vehicle engine. Further, the present invention is applicable to a multi-cylinder engine. In the above embodiment, the gear transmission and the belt converter are integrated with the engine. In the present invention, the gear transmission and the belt converter may also be separated from and coupled to the engine. Thus, the present invention can be used for engines of various configurations.

(2) The present invention is not limited to the configuration of the above embodiment, but includes various modifications considerable in the scope without departing from the contents described in the claims.

What is claimed is:

1. An engine with a centrifugal clutch comprising:
    a) a crankshaft which has at least a pair of journal portions spaced apart from each other in a direction of the crankshaft;
    b) a crankcase which rotatably supports one of the pair of journal portions of the crankshaft via a bearing metal and rotatably supports the other of the pair of journal portions via a bearing;
    c) the centrifugal clutch which is mounted at an end of the crankshaft where the bearing is arranged;
    d) a main oil passage connected to an oil pump which is rotated by the crankshaft;
    e) first oil supplying means formed in the crankshaft to supply oil to the centrifugal clutch, the first oil supplying means having an oil passage for the first oil supplying means which is communicated with the main oil passage through an oil hole formed in the bearing metal and extends through a fitting portion of a crankpin to the centrifugal clutch; and
    f) second oil supplying means which supplies oil to the centrifugal clutch, the second oil supplying means having an oil passage for the second oil supplying means which is communicated with the main oil passage and extends in a wall of the crankcase toward where the centrifugal clutch is arranged, and an oil nozzle which is communicated with the oil passage for the second oil supplying means and ejects the oil toward an inner member of the centrifugal clutch and a cylindrical portion of a clutch housing surrounding the inner member.

2. The engine with the centrifugal clutch according to claim 1, further comprising:
    f) third oil supplying means which supplies oil to the centrifugal clutch, the third oil supplying means having an oil reservoir which reserves the oil at a lower end of a clutch housing which houses the centrifugal clutch to a height at which a lower end of the centrifugal clutch is immersed.

3. An engine with a centrifugal clutch comprising:
    a) a crankshaft which has at least a pair of journal portions spaced apart from each other in a direction of the crankshaft;
    b) a crankcase which rotatably supports one of the pair of journal portions of the crankshaft via a bearing metal and rotatably supports the other of the pair of journal portions via a bearing;
    c) the centrifugal clutch which is mounted at an end of the crankshaft where the bearing is arranged;
    d) a main oil passage connected to an oil pump which is rotated by the crankshaft;
    e) first oil supplying means formed in the crankshaft to supply oil to the centrifugal clutch, the first oil supplying means having an oil passage for the first oil supplying means which is communicated with the main oil passage through an oil hole formed in the bearing metal and extends through a fitting portion of a crankpin to the centrifugal clutch; and f) second oil supplying means which supplies oil to the centrifugal clutch, the second oil supplying means having an oil reservoir which reserves the oil at a lower end of a clutch housing which houses the centrifugal clutch to a height at which a lower end of the centrifugal clutch is immersed.

4. The engine with the centrifugal clutch according to claim 3, wherein the oil reservoir is provided with a weir which stops the oil at a predetermined height, and the weir is formed at a lower end with a hole which gradually discharges the stopped oil.

5. An engine with a centrifugal clutch comprising:

a) a crankshaft which has at least a pair of journal portions spaced apart from each other in a direction of the crankshaft;

b) a crankcase which rotatably supports one of the pair of journal portions of the crankshaft via a bearing metal and rotatably supports the other of the pair of journal portions via a bearing;

c) the centrifugal clutch which is mounted at an end of the crankshaft where the bearing is arranged;

d) a main oil passage connected to an oil pump which is rotated by the crankshaft; and e) first oil supplying means formed in the crankshaft to supply oil to the centrifugal clutch, the first oil supplying means having an oil passage for the first oil supplying means which is communicated with the main oil passage through an oil hole formed in the bearing metal and extends through a fitting portion of a crankpin to the centrifugal clutch, wherein a clutch housing of the centrifugal clutch is coupled to a drive shaft of a V-belt type continuously variable transmission arranged on an extension line of the crankshaft.

* * * * *